Figure 1:
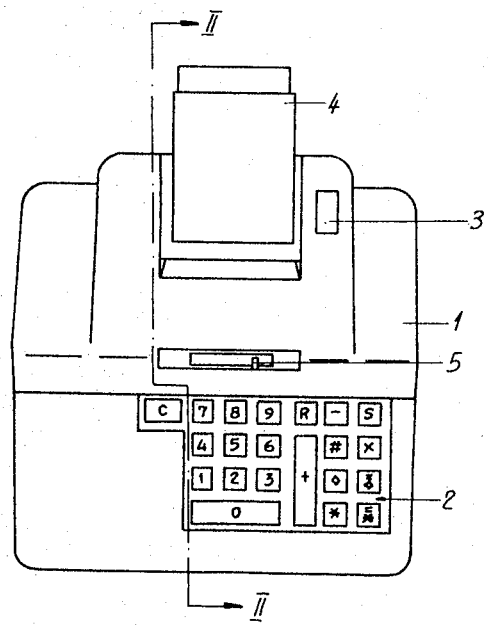

Aug. 23, 1966         H. GELLING         3,268,165
MULTIPLICATION DEVICE FOR A THREE-SPECIES
CALCULATING MACHINE

Filed June 10, 1964                           10 Sheets-Sheet 1

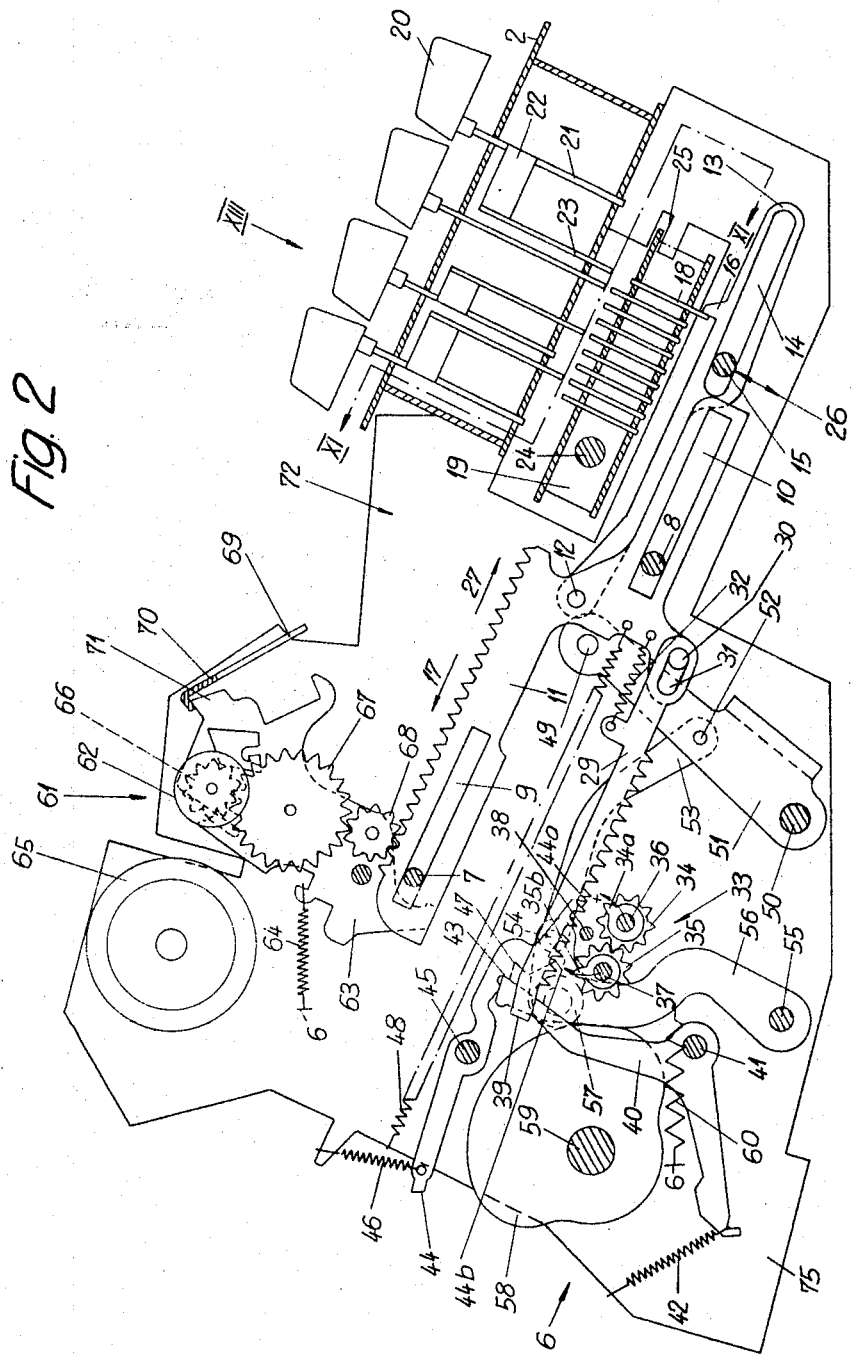

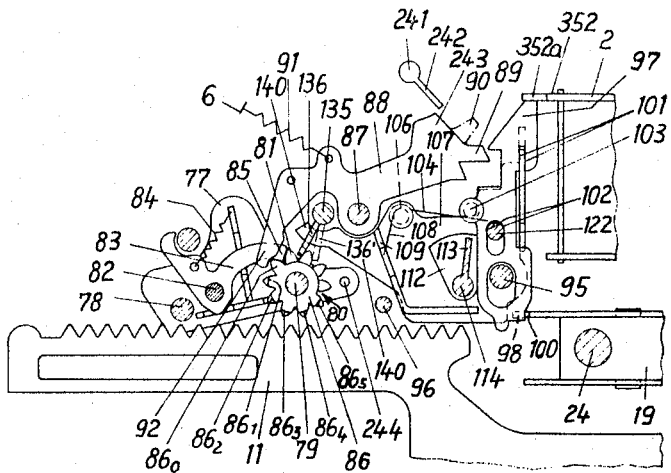
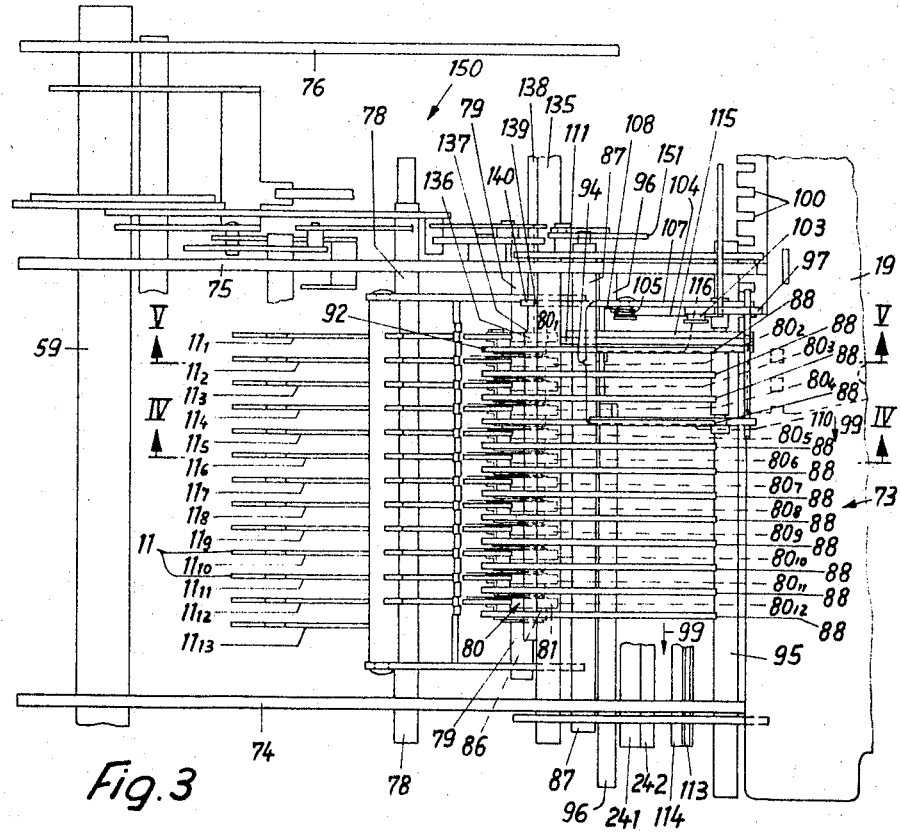

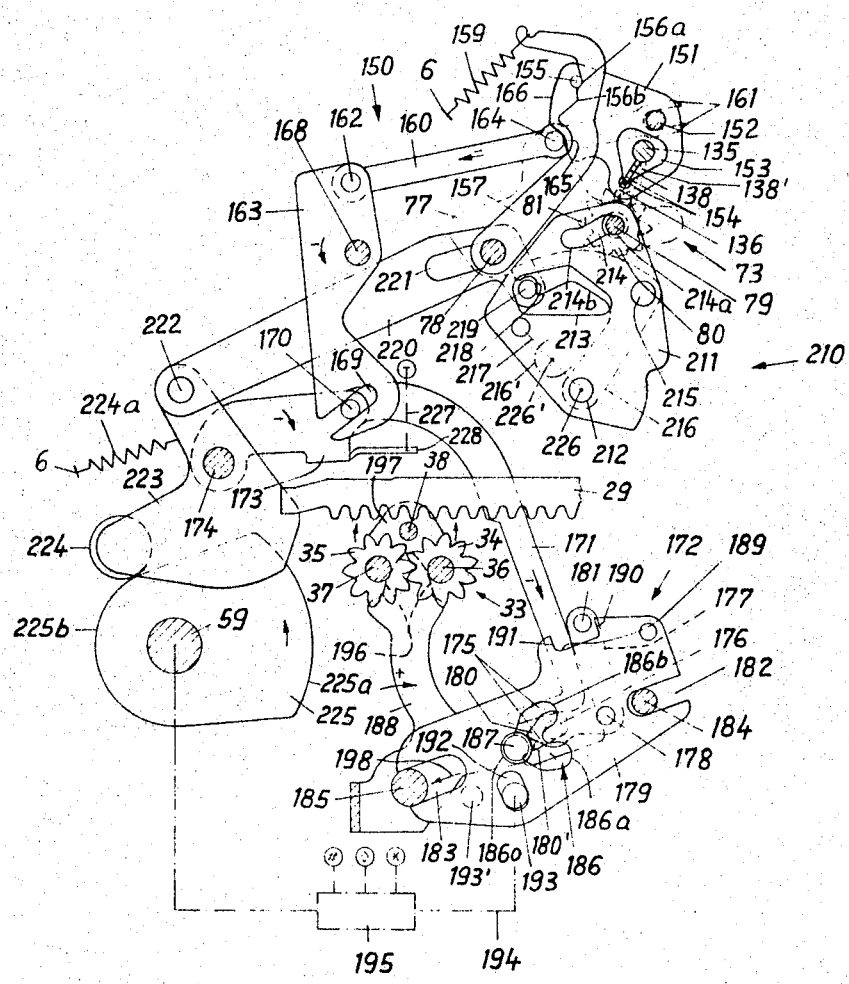

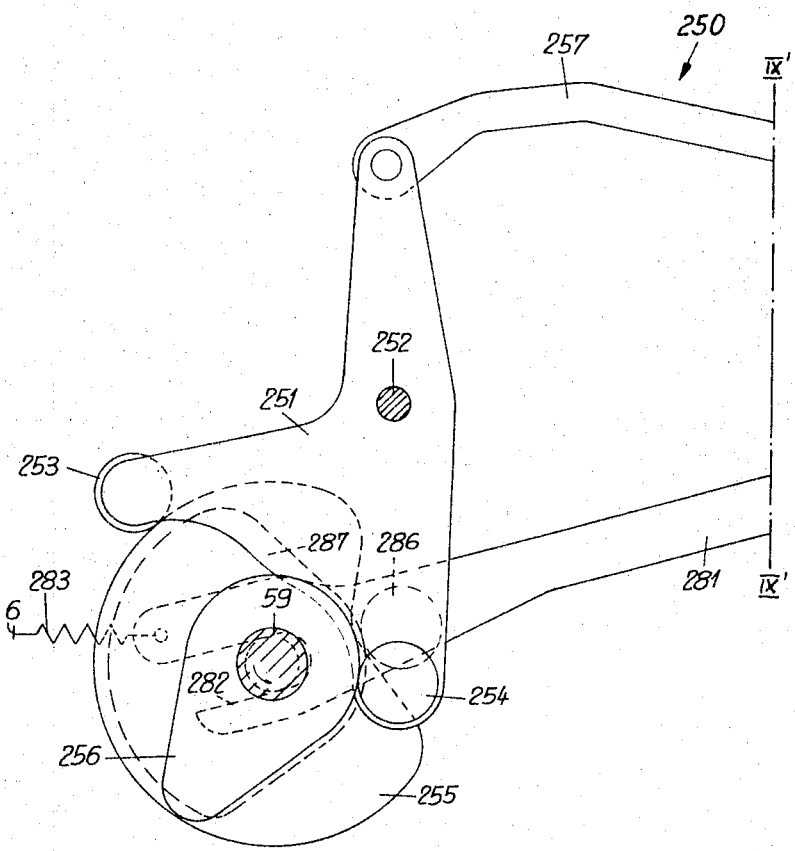

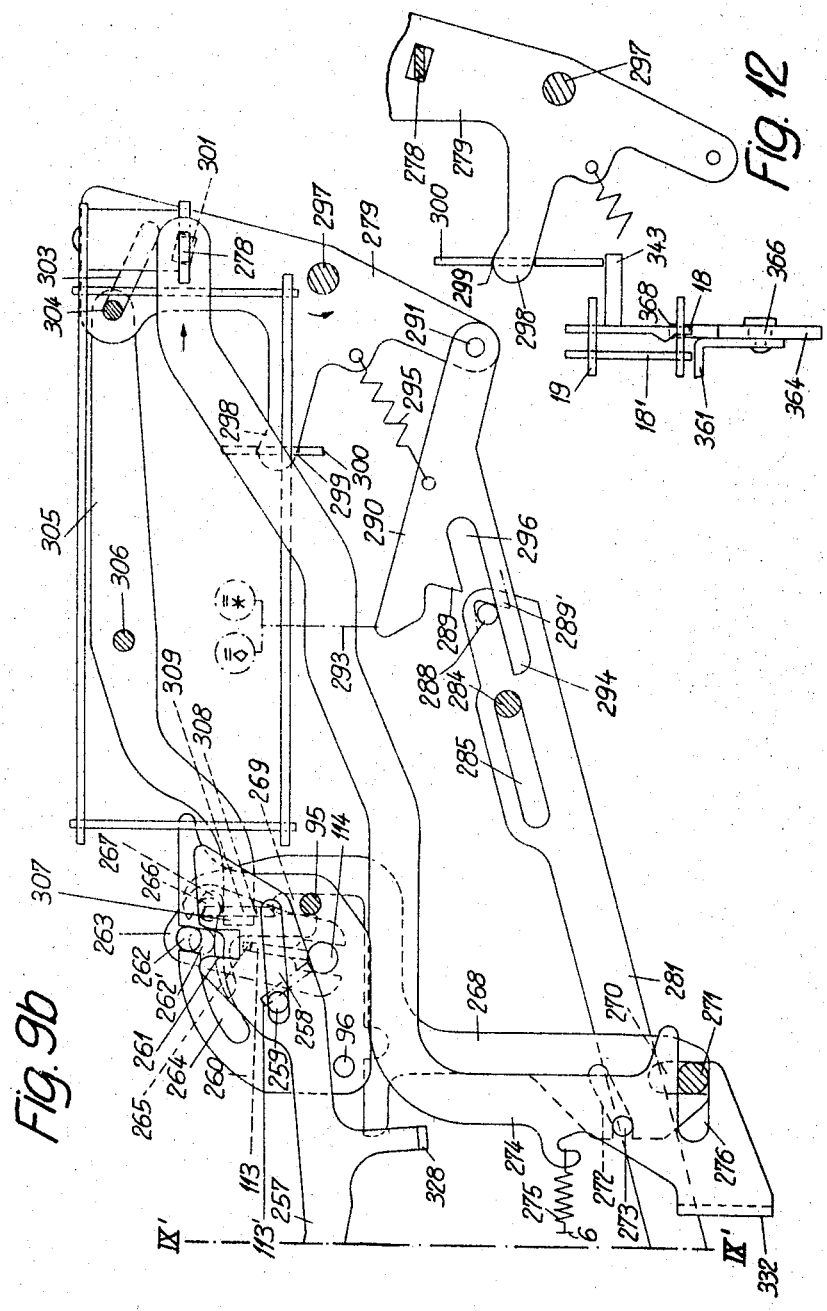

Aug. 23, 1966  H. GELLING  3,268,165
MULTIPLICATION DEVICE FOR A THREE-SPECIES
CALCULATING MACHINE
Filed June 10, 1964  10 Sheets-Sheet 8

Fig. 10

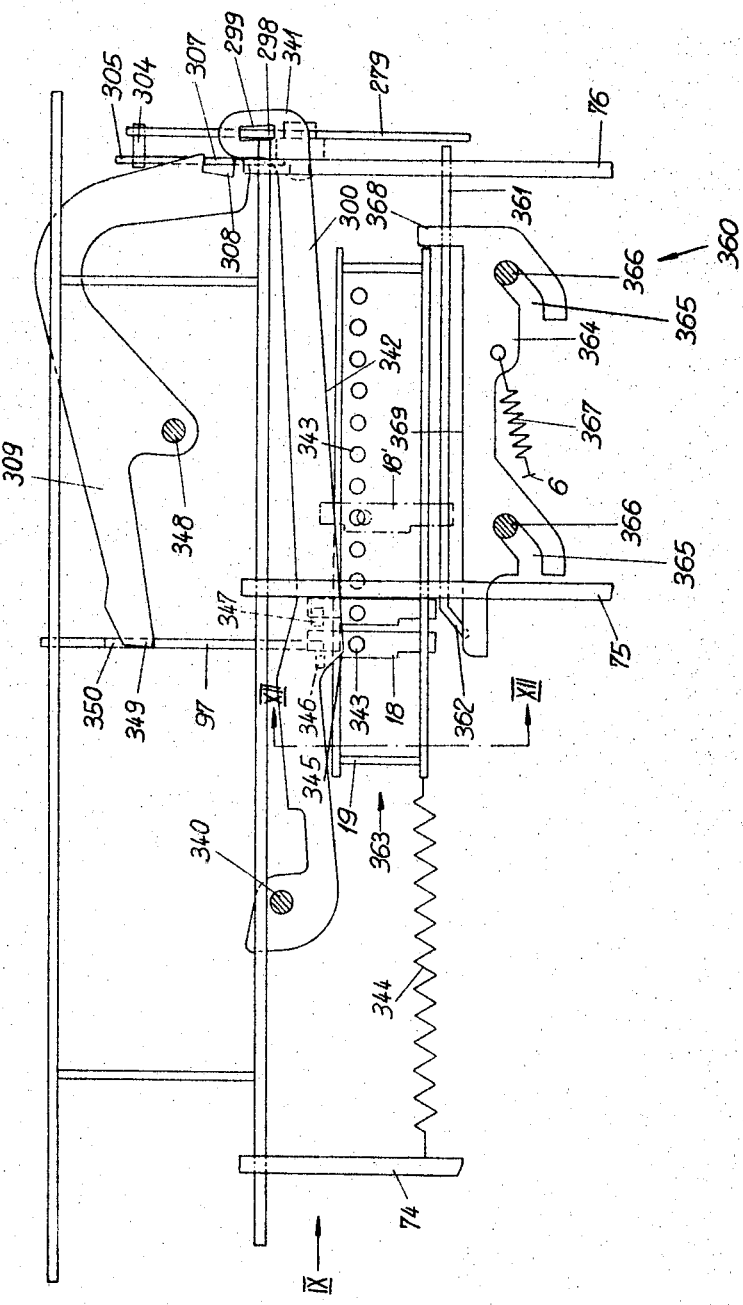

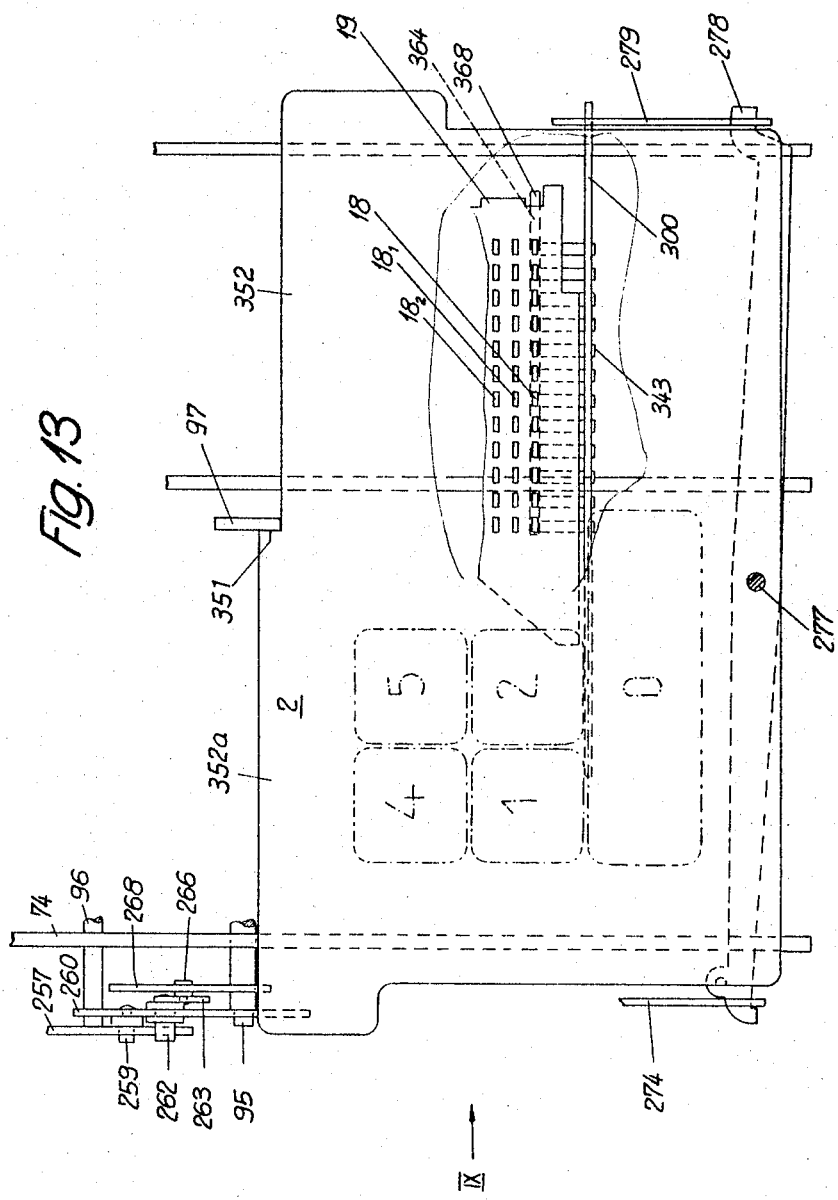

United States Patent Office 3,268,165
Patented August 23, 1966

3,268,165
MULTIPLICATION DEVICE FOR A THREE-SPECIES CALCULATING MACHINE
Helmut Gelling, Dietlikon, near Zurich, Switzerland, assignor to Precisa A.G., Zurich, Switzerland
Filed June 10, 1964, Ser. No. 374,082
Claims priority, application Switzerland, June 12, 1963, 7,362/63
14 Claims. (Cl. 235—60)

The invention relates to a calculating machine and particularly to a multiplication device operating according to the abbreviated method and suitable for a nine key calculating machine with the keys arranged in sets of three. The multiplication device is provided with a pin carriage in which are to be entered consecutively the two factors which are to be multiplied with one another by means of an intermediary actuation of a multiplication key, in order to cause reciprocating or to-and-fro movements of rack bars which correspond to the numbers of these factors. This multiplication device is provided also with a multiplier storage device which is connectable with these rack bars for receiving the multiplier. The latter controls a computer so that in the same, according to increasing decimal points, the numbers which are stored in the multiplier storage are multiplied and the multiplicands result therefrom.

Such multiplication devices are known, but they have the disadvantage of requiring much space and very many individual parts, particularly two rows of storage gears, and also a complicated and bulky ten-transfer device.

It is an object of the invention to provide a multiplication device in which the multiplier storage comprises a single row of storage wheels which is loosely rotatable on an axle, whereby each storage wheel consists of a full ten-tooth gear wheel and a mutilated gear. Said multiplier storage contains also a freely swingable and longitudinally slidably supported swivel-bar which through engagement with the gear wheels upon resetting of the first storage wheel which is in one of the storage positions "6 to 9," to its "0" position, steps up all storage wheels of higher decimal position by one tooth in positive direction, and which later cancels the shifting step so effected again for all those storage wheels whose decimal point is higher than those of the next storage wheel, which then from an assumed position "1 to 5" is set back to its "0" position, whereby the return of the storage wheels takes place during the control of scanning levers which engage the mutilated gear, whereby the latter has teeth which are of different height for the positions "0" or "1 to 5" or "6 to 9."

The drawing shows by way of example one embodiment of the device of the invention.

Figure 5:
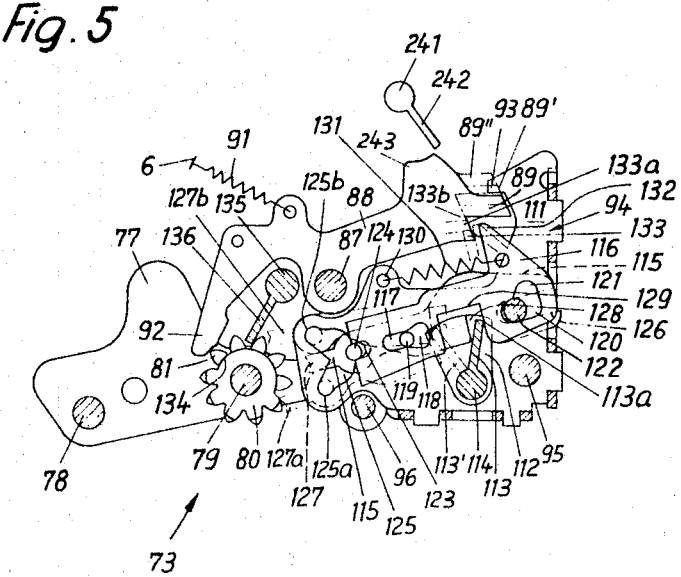
Figure 7:
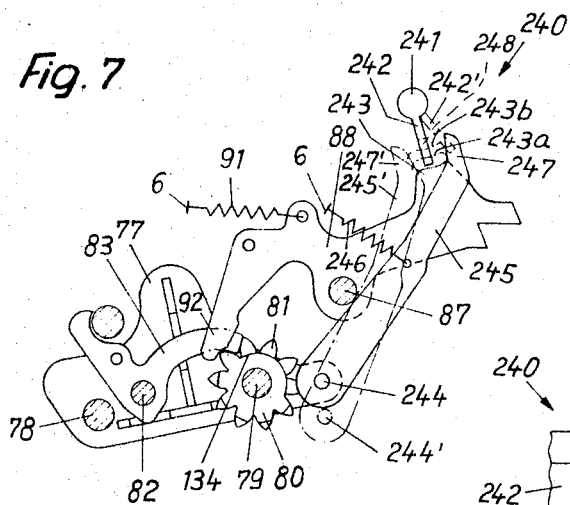
Figure 8:
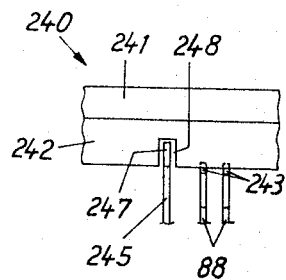

FIG. 1 is a top plan view of a calculating machine;
FIG. 2 is a vertical longitudinal section of this machine, substantially along the line II—II of FIG. 1;
FIG. 3 is a top plan view of an important portion of the calculating mechanism;
FIG. 4 is a sectional view of the multiplier storage device substantially according to line IV—IV of FIG. 3;
FIG. 5 is another sectional view of the multiplier storage device, substantially along the line V—V of FIG. 3;
FIG. 6 is a sectional view substantially along the line VI—VI of FIG. 3 which shows a control device for a computer;
FIG. 7 is a view of a control device for the multiplier storage device;
FIG. 8 is another view of the control device according to FIG. 7;
FIG. 9a is a view of a drive mechanism arranged to the left of the machine frame;
FIG. 9b is a view of a control mechanism disposed to the right of the frame viewed in the direction of the arrow IX of FIGS. 11 and 13, with omission of the frame. The FIGS. 9a and 9b should be combined along the line IX′—IX′.

FIG. 10 is a view of a disconnect mechanism;
FIG. 11 is a sectional view substantially along the broken line XI—XI of FIG. 2;
FIG. 12 is a sectional view along the line XII—XII of FIG. 11, and
FIG. 13 is a top plan view of the front portion of the machine when viewed in the direction of the arrow XIII of FIG. 2, with omission of numerous elements of the same.

Referring to the figures of the drawing, the same illustrate in each instance solely those elements which are necessary for the understanding of the description. The basic three-species calculating machine was developed from an addition and subtraction machine built by the inventor years ago and known in the trade as "Model 162." The latter is now improved by the addition of a multiplication device operating according to the abbreviating method. The principal dimensions of the machine and of its mechanisms serving for carrying out the addition and subtraction remained unchanged.

The calculating machine is provided, according to FIG. 1, with a casing 1 and a keyboard 2 having ten number keys and a number of function keys. The operation of the function keys already present in the Model 162 is apparent from their conventional designations: "+" addition key, "−" subtraction key, "C" correction key, "R" repetition key, "S" storage key, "#" non-addition or number key, "◊" intermediary summation key, "*" final summation key. Newly added are the following function keys:

"x" key which after entering of the first factor is depressed by means of the number keys in order to effect the reception of this factor in the multiplier strong device.

"$\overline{\diamond}$" key is designated as "multiplication key" which after entering of the second factor by means of the number keys effects the printing of the second factor, which effects the carrying out of the multiplication and the printing of the product as an intermediary sum. This key is designated as "intermediary sum-product key."

"$\overline{\ast}$" key which in addition to the operations effected by the key $\overline{\diamond}$ also effects the totaling and printing of the prior products. This key is designated as "Final summation product key."

Referring to FIG. 1, the calculating machine of the invention is provided similarly as the mentioned Model 162 with a roller over which passes a paper strip 4 and which is rotated by an operating knob 3 and a decimal point indicator 5.

With reference to FIG. 2, a few additional parts of the Model 162 will be described which are also employed in the present machine and cooperate with the added multiplication device.

In a frame 6 are fixed two transverse guide rods 7 and 8 which pass through elongated slots 9 and 10 of a plurality of first rack bars 11 disposed one behind the other when viewing FIG. 2. These guide rods guide the rack bars 11 in their reciprocating movement. To the rack bar 11 is pivoted between its ends at 12 a rocker arm 13 which has an elongated slot 14 through which passes a guide rod 15. The rocker arm 13 has a nose portion 16 between its ends which limits the "forward" movement of the rack bars 11, that is, their movement in the direction of the arrow 17 until the nose portion 16 engages a pin 18 of the pin carriage 19. In FIG. 2 it is assumed that the pin 18 lying farthest to the right, is brought downward through pressing of that key 20 which corresponds to the numeral "0," that is, into the operating position. Each key 20 is provided with a guide shaft 21 which is connected through an arm 22 with an actuating shaft 23 which upon pressing of the key 20 encounters the pin 18 of the pin carriage 19 disposed below it at the time.

The pin carriage 19 is guided on a guide rod 24 fixed to the frame, and also in a guide slot 25 provided on the frame, and contains a plurality of consecutively disposed rows of nine pins each, whereby the pin carriage after entering of a number is moved on a step at the time in the usual manner corresponding to the spacing of two rows of pins along the guide means 24 and 25, in order to be able to receive another number.

The guide rod 15 is not fixedly mounted in the frame 6, but is moved to and fro in direction of the double arrow 26 so that the nose portion 16 of the rocker 13 may encounter a depressed pin 18 solely upon a forward movement of the rack bar 11 in direction of the arrow 17, but not upon a rearward movement in direction of the arrow 27, in order to be able to carry out the rearward movement of the rack bar 11 already before the erasure of the number entered in the pin carriage, that is, before the return of all the pins 18 into their position of rest.

The first rack bar 11 has pivoted thereto a second rack bar 29 by means of a pin 30 which passes through an elongated hole 31 of this second rack bar 29. A spring 32 attempts to draw the second rack bar 29 to the right, but this is normally prevented by means described hereinafter. The lengthwise movement of the second rack bar 29 with reference to the first rack bar 11 is necessary for the ten-transfer of a computing device 33 which mainly consists of two rows of gear wheels 34 and 35 which are pairwise in engagement with one another, said gear wheels being loosely rotatably mounted on two shafts 36 and 37, respectively.

The two shafts 36 and 37 are bodily movable about a fixedly mounted rod 38 in the direction of the arrow designated with + and —. For carrying out an addition, the computing device 33 must be pivoted in the + direction, so that the gear wheels 34 may enter into engagement with the rack bars 29. For the carrying out of a subtraction, however, the gear wheels 33 must, to the contrary, be brought into engagement through a pivoted movement in the — direction with the rack bars 29.

The free end of the second rack bar 29 is bent and engages the upper arm of an angle lever 40 which is journaled on a rod 41 fixed to the frame. A spring 42 attempts to move the lever 40 in clockwise direction (see FIG. 2) which, however, in the position shown is prevented by a first abutment 43 on a tens swing arm 44 which is pivotally mounted on a rod 45 fixed to the frame. A spring 46 attempts to rotate the swing arm 44 in clockwise direction. The abutment 43 and the bent end 39 hold the rack bar 29 in the position shown against the tension of the spring 32. The gear wheels 34 and 35 each have a tooth 34a and 35b, respectively, which in axial direction is appreciably wider than the other teeth, and indeed so that the teeth 34a and 35b of the gear wheels 34 and 35 of lower decimal position and arranged adjacent to the gear wheels shown may engage two shoulders 44a and 44b, respectively, which are provided on a part of the tens swing arm 44 disposed behind the rack bar 29. If the computing device 33 is pivoted in the + direction and the wide teeth 34a, after a complete revolution of the gear wheel 34 associated with a lower digit, engages the shoulder 44a, the ten digit swing arm 44 is rotated somewhat in counterclockwise direction, so that the lever 40 is released from the first abutment 43 and by the spring 42 is moved against a second abutment 47 on the swing arm 44. In view thereof, the rack bar 29 may follow the tension of the spring 32 so that the gear wheel 34 is rotated one-tenth of a revolution and thereby the tens transfer is completed. In similar manner, upon pivoting of the computing device 33 in the — direction, the wide tooth 35b and the shoulder 44b cooperate.

In order to carry out the reciprocating movement of the rack bars 11, the latter are on the one hand under the influence, each, of a spring 48 and a lifting rod 49 which is mounted on the upper free ends of two parallel levers 51 pivoted with their lower end about a rod 50. The levers 51 have between their ends at 52 one end of a link 53 pivotally connected thereto which at 54 is pivoted to a lever 56 whose lower end is pivotable at 55. The lever 56 carries a scanning roller 57 which engages the circumference of a cam plate 58 mounted on a main shaft 59. A spring 60 urges the scanning roller 57 on the lever 56 in contact with the cam plate 58.

The main shaft 59 is in the customary manner connectable with an electromotor which is set in operation at the beginning of the calculating operating, whereby the drive connection is controlled by the function keys and—upon carrying out a multiplication—by the multiplier storage device which effects the revolutions of the main shaft 59 necessary at the time.

It is apparent that when the scanning roller 57 engages the greatest radius of the cam plate 58, the rack bars 11 are moved the farthest in the rearward direction 27. When the scanning roller 57, however, reaches the smallest radius of the cam plate 58, the rack bars 11 follow the pull of the springs 48 so far as is permitted by the position of the set pin 18 of the pin carriage 19. Upon the next rearward movement, the number shown at the time by the position of the rack bars is rotated positively or negatively into the computing device, whereby on account of the ten-transfer the sum (or difference, respectively) of the successively entered numbers is formed. The sum formed in the computing device may then at the particular time be transferred through a pivotal movement of the same to the rack bars 29 and 11.

The rack bars 11 operate together with a printing device 61 which is provided with a type-lever 63 carrying typing wheels 62, said type-lever being drawn by a spring 64 toward the writing roller 65. The type wheels 62 are connected with the rack bars 11 by gear wheels 66, 67 and 68. A hook-shaped pawl 70 is pivoted at 69, engages a projection 71 on the type lever 63 and holds the lever 63 against the force of the spring 64, and then at times releases it, if the number corresponding to the position of the rack bars 11 is to be printed. The spring 64 is then tensioned again in customary manner, the more so, since the parts of the machine described up to now are employed in the mentioned calculating machine Model 162.

In order to be able to employ an addition and subtraction machine of the present type also for multiplying operations, a multiplication device is required which is capable of carrying out substantially the following functions:

(1) The first factor (multiplier) of the product to be formed after being entered into the pin carriage 19 has to be introduced into a multiplier storage device.

(2) After erasure of the first factor and insertion of the second factor (multiplicand) into the pin carriage 19 the latter must be shifted stepwise from one decimal point to the next relative to the row of the rack bars 11; at each of these decimal points the rack bars must be moved to and fro a number of times dependent on the adjustment of the corresponding position of the multiplier storage device, whereby each time the computing device 33 must come into engagement with the rack bars 29. Accordingly, with each step of the pin carriage 19 through repeated totalizing of the multiplicand a partial product is formed in the computing device 33, which latter at the same time totalizes all these partial products corresponding to their decimal point.

In a multiplication device which operates according to the abbreviation method, the same product is calculated as $(30-2) \times 35$, for which purpose are required in the tens digit place three calculating steps and in the one digit place two calculating steps, in total only five calculating steps. Care must be taken, however, that the partial product of the one digit place is subtracted. The formation of the product therefor takes place according to the following schedule:

$$-2 \cdot 35 = -70$$
$$+3 \cdot 10 \cdot 35 = +1050$$
$$28 \times 35 \quad +\overline{980}$$

With the abbreviation method, along the line of this example, all numbers 6 to 9 are replaced by the complementary numbers 4 to 1, whereby the number on the preceding decimal point is increased by "1."

Multiplication devices operating according to the abbreviation method are well known; they have the great advantage as compared with the multiplication devices operating according to the normal method, of operating much faster, for which reason it is generally taken into consideration that they require a control device between the multiplier storage device and the computing device in order to bring the latter at times at each decimal point into the correct addition or subtraction position.

In the known abbreviation multiplication devices, the multiplier storage device has two sets of storage wheels whereby each of these sets has as many number wheels as decimal points are provided. The presence of these two sets of storage wheels is disadvantageous in double respect, as first of all the cost of the completion and mounting of the multiplier storage device is very high and secondly, the device requires much space.

According to the development of the present calculating machine from the Model 162, particularly the space requirement plays a decisive part. For the accommodation of the multiplier storage device, there is substantially available solely the space designated with the reference character 72 in FIG. 2, above the rack bars 11, between the keyboard 2 and the printing device 61. It was found that this space 72 was insufficient to be able to use multiplication devices constructed in known manner, unless the number of decimal points available for the formation of the product was substantially reduced. Instead of having twelve decimal points available as for the sum and difference formation (there are thirteen rack bars 11 or 29, respectively, present and the computing device 33 calculates in thirteen digits), one would have to be satisfied for the product formation with about six decimal points, or else the dimensions of the addition and subtraction machine would have to be altered. These great disadvantages are overcome by the multiplication device described in the following.

The multiplication device has a multiplier storage 73 which is shown in the FIGS. 3 to 5. FIG. 3 also shows the construction of a large part of the framework 6 and additional mechanisms. The framework 6 is provided with three parallel longitudinal and vertical walls 74, 75 and 76 in which, among others, the main shaft 59 is journaled. The multiplier storage device 73 has a frame 77 which is pivotally positioned on a transverse rod 78 fixed to the framework and carries an axle 79 parallel thereto, on which a series of twelve storage wheels 80 is loosely rotatably mounted. Each storage wheel 80 is provided with ten teeth 81 so that the storage wheels 80 may be brought through a pivotal movement of the frame 77 in clockwise direction (FIG. 4) into engagement with the rack bars 11 in order to introduce the multiplier entered into the pin carriage 19 in the multiplier storage device 73. An angular lever 83 which is pivotally journaled at 82 on the frame 77 and is under the influence of a spring 84 is provided at one end with a nose 85 which is pressed by this spring 84 into a tooth gap between the teeth 81 of the storage wheel 80 in order to fix the latter in its position when it has again been swung back by the rack bar 11 into the position shown in FIGS. 3 and 4. Adjacent the storage wheel 80 having the teeth is arranged a multilated gear wheel (see FIG. 4) 86 which has only six teeth $86_0$ to $86_5$ extending along a portion of its circumference (see FIG. 3). The tooth $86_0$ which corresponds to the number "0" has in radial direction the same height as the tooth 81 of the wheel 80 lying adjacent thereto; the teeth $86_1$ to $86_5$, however, which correspond to the number "1" to "5" are in radial direction only half as high as the tooth $86_0$, while for the numerals "6" to "9" the remaining portion of the circumference of the mutilated gear wheel 86 has no teeth at all. Of course, the storage wheels 80 consisting each of the gear teeth 81 and the mutilated gear wheel 86 are produced from one single work-piece, for example by a milling operation.

A stationary axle 87 has pivotally mounted thereon a number of scanning levers 88 associated with the storage wheels 80. Each scanning lever 88 has two projections 89 and 90, of which the latter is indicated only in dotted lines in FIG. 4. The projection 90 pertains to a device for limiting the digits of the second factor (multiplicand) in dependency on the digits of the first factor (multiplier).

A spring 91 attempts to move the scanning lever 88 in counterclockwise direction from the position shown in the FIGS. 4 and 5, so that the lower end 92 of this lever 88 is urged against the circumference of the gear wheel 86. The projection 89 of the scanning lever 88 may in a manner to be described hereinafter also cooperate with a projection 93 on a shift carriage 94 in order to limit the movement of the same. This limitation takes place when the lug 89 has been moved into one of the two positions 89' or 89" indicated in dash and dotted lines in FIG. 5, in which position the projection 89 comes to lie when the scanning lever end 92 does not engage the tooth $86_0$, but engages one of the gear teeth $86_1$ to $86_5$, respectively, or the mutilated gear wheel 86 at the place where it has no teeth.

The switch carriage 94 is transversely slidably mounted on spaced parallel horizonal rods 95 and 96 fixed to the framework. A clutch carriage 97 (see FIG. 4) is mounted vertically slidably on the horizontally movable switch carriage 94 and has a coupling projection 98 at its lower end for connecting the switch carriage 94 with the pin carriage 19, so that the two carriages 19 and 94 may move together stepwise; this takes place, after calculation of the respective partial product, in the direction of the arrow 99 shown in FIG. 3 in a manner to be described later in more detail. The pin carriage 19, for the purpose of making this coupling connection, is provided at its left hand upper rim (when viewing FIGS. 2 and 4) with a series of notches 100 one of which the coupling projection 98 may engage. The clutch carriage 97 is vertically guided at 101 and 102 on fixed mounted elements and is provided with a headed pin 103 which is engaged by one leg 104 of a spring 105 tending to move the pin 103 upwardly. The spring 105 is wound around a pin 106 which is fixed to a first side wall 107 of the carriage 94, and the other leg 108 of the spring 105 is supported at 109.

The switch carriage 94 has a second side wall 110 and an intermediary wall 111. Each wall 107, 110, 111 is provided with a sector-shaped perforation 112 through which a swivel shaft 114 passes which is along its circumference provided with an elongated bar 113 (drive bar). The latter is pivotable to and fro about the axis of the shaft 114 and serves for operating an impact member 115. A swivel plate 116 is provided at its left hand end with an elongated slot 117 having its right hand end widened at 118 in which a pin 119 engages which is fixed on the intermediary wall 111. Furthermore, the swivel plate 116 has at its right hand end an elongated aperture 120 whose right hand end has an enlarged bulge 121 through which extends a fixedly mounted rod 122 which also serves as a guide for the clutch carriage 97. On its left hand end the swivel plate 116 has a small recess 123 which forms a seat for a pin 124 fixed on the impact member 115.

The pin 124 passes through an aperture 125 in the intermediary wall 111. This aperture 125 has two legs 125a and 125b which are inclined towards one another and in which the pin 124 may enter upon movement of the impact member 115 so that the position of the pivot plate 116 decides in which leg the pin 124 enters. The impact member 115 has at its right hand an elongated slot 126 which serves for its guidance on the rod 122. The left hand end 127 of the impact member 115 is somewhat indented, so that it may cooperate in the manner shown at 127a and 127b in dash-dotted lines with the gear teeth 81 in order to rotate the storage wheel 80 in the one or in the other direction each time about the distance of one tooth. The impact member 115 has also a recess 128 into which engages the drive bar 113 for actuating the impact member 115.

The swivel plate 116 is provided with a large rectangular recess 129 for the passage of the drive bar 113, so that the latter upon its forward swing does not encounter the swivel plate, 116, however, takes it back upon its return swing.

A spring 131 fixed on the intermediary wall 111 at 130 draws the swivel plate 116 toward the left. The swivel plate 116 has a projection 132 which upon movement of the swivel plate 116 toward the left may or may not encounter a shoulder 133 formed on the scanning lever 88, depending upon the position of the scanning lever 88.

When the storage wheel 80 is in its "0" position as shown in the FIGS. 4 and 5, the stored number of the respective decimal point of the multiplier is "0," and the switch carriage 94 coupled with the pin carriage 19 is not maintained in the position corresponding to this storage wheel 80, but moves further to the next storage wheel which is not in the "0" position. If one of the half-high teeth $86_1$–$86_5$ is located below the end 92 of the scanning lever 88, then the latter is pivoted with respect to the position shown somewhat in counterclockwise direction, and its shoulder 133 has the position designated in dotted dash lines in FIG. 5. If the drive bar 113 is now shifted to the left into the position 113' indicated in dotted dash lines, then the swivel plate 116 can follow due to the tension of the spring 131 to the left, until its projection 132 strikes against the shoulder 133 found in the position 133a. From this moment on, the pull of the spring 131 effects a pivotal movement of the swivel plate 116 in clockwise direction, about the corner of the shoulder 133 serving as center of rotation. In view thereof, the recess 123 of the swivel plate 116 guides the pin 124 of the impact member 115, which is moved to the left by the drive bar 113, into the upper leg 125b of the aperture 125 in the intermediary wall 111. The impact member end 127 in view thereof moves into the position 127b and rotates the storage wheel 80 in counterclockwise direction a distance of about one tooth. If, for example, the number "4" was stored in the storage wheel 80, in which the tooth $86_4$ was positioned below the scanning end 92, then the drive bar 113 is swung four times to and fro until again the tooth $86_0$ has arrived under the scanning end 92. In what manner the swivel movement of the bar 113 is initiated and stopped will be explained hereinafter.

If the storage wheel 80 has stored therein one of the numbers "6" to "9," the scanning end 92 rests on the toothless portion 134 of the mutilated gear wheel 86 and the shoulder 133 is found in a position 133b, which no longer lies in the way of the projection 132. Upon a pivotal movement to the left of the drive bar 113, the swivel plate 116 is again drawn to the left by the spring 131, at the same time, however, not in clockwise but in counterclockwise direction, in fact, about the edge 113a of the swivel bar 113. In view thereof, the pin 124 of the impact member 115 now enters in the lower leg 125a of the aperture 125, and the impact member end 127 comes into the position 127a, so that the storage wheel 80 is rotated in clockwise direction a distance of about one tooth. If, for example, the number "8" was stored, then the storage wheel 80 is brought by two reciprocating movements of the drive bar 113 again into the "0" position. It is apparent that the earlier described form of the right hand ends of the elongated slot 117 and the aperture 120 of the swivel plate 116 has the purpose of assuring its indicated swivel-slide movements.

A freely swingable and longitudinally slidably disposed axle 135 is provided on its circumference with an elongated bar 136 which has a shoulder 137 (see FIG. 3) which changes the width of the strip to a narrow one, as shown at 138, in which a transverse slot 139 is provided. An arm 140, which is provided on the side wall 107 of the switch carriage 94, passes through this transverse slot 139 (FIG. 4). When the switch carriage 94 by means of its clutch carriage 97 is coupled with the pin carriage 19 and the latter carries out its transverse movement, the axle 135 will accordingly also be shifted with its longitudinal rods 138 and 136 in transverse direction. The longitudinal bar 136 is so wide that it projects into the range of the teeth 81 on the storage wheels 80, while this is not the case for the longitudinal bar 138.

The bar 136 is of essential importance for the construction of the present multiplication device in that it makes the second pair of storage wheels provided in known multiplier storage devices and the tens-transfer device superfluous. The swingable bar 136 operates as follows:

When the impact end 127 rotates the storage wheel 80 away from the shown position a distance of one tooth 81 in counterclockwise direction, then the bar 136 is rotated in clockwise direction until under the influence of means to be described later it drops back over the advanced tooth in its position shown in FIGS. 4 and 5. All other storage wheels 80 remain uninfluenced by this movement of the swingable bar 136. When the impact end 127, however, rotates the storage wheel 80 a distance of one tooth in clockwise direction, then the bar 136 is engaged from the left by the tooth adjacent the same and imparts through its shifting effected thereby to the position 136' indicated in dotted-dash lines in FIG. 4, to all other storage wheels 80 which are located under it likewise a rotation equal to the distance of one tooth in the clockwise direction. If the impact member 127 later on engages another storage wheel 80 and moves the same in counterclockwise direction, then the swingable bar 136 returning from the position 136' into its starting position also rotates all other storage wheels still in engagement with it again a distance equal to one tooth backwards in counterclockwise direction.

The modus operandi of the described multiplier storage device 73 will now be explained more in detail with reference to a numerical example. It is desired to determine the product of 287×356. In the following, first only the steps essential for the understanding of the multiplication procedure will be explained, while the means for carrying out these steps will be described later.

The multiplier 287 is entered by means of the number keys into the pin carriage 19. The frame 77 is pivotally moved in clockwise direction until the gear teeth 81 of the storage wheels 80 (see FIG. 3) come into engagement with the rack bars 11. Upon a now following forward movement of the rack bars 11, the numbers 7, 8 and 2 are rotated by the rack bars $11_1$–$11_3$ into the units digit storage wheel, the tens digit storage wheel and the hundreds digit storage wheel, $80_1$, $80_2$ and $80_3$, respectively, in clockwise direction, whereupon the frame 77 is pivoted back into the illustrated position and the storage wheels 80 are held stationary by the holding lever 83 in the adjusted positions. The other storage wheels 80 remain in the "0" position.

After erasure of the multiplier and entering of the multiplicand 356 in the pin carriage 19, there takes place first the multiplication of the first digit of the multiplier. At the first multiplication calculation step, the multiplicand 356 is once rotated into the computing device 33. Since in the first digit position the scanning end 92 engages the portion 134 of the mutilated gear 86, the shoulder 133 accordingly will be in the upper position 133b outside of the path of the projection 132 of the swivel plate 116, and the impact end 127—as described previously—rotates the storage wheel 80 a distance of one tooth 80 farther in clockwise direction, namely into the position "7+1=8." This has the effect that by means of the swingable bar 136 moving into the position 136' also all of the other storage wheels 80 are rotated a distance of one tooth further in clockwise direction. The storage wheel $80_2$ accordingly comes into the position "8+1=9"; the storage wheel $80_3$ comes into the position "2+1=3," and the storage wheels $80_4$–$80_{12}$ come into the position "0+1=1." During the second calculating step at which again the multiplicand 356 is entered in the computing device 33, the storage wheel $80_1$ is clockwise rotated a distance of one tooth farther into the position "9." While the swingable bar 136 is moved away from its position 136', it is, however, not able to rotate the other storage wheels 80, but drops under the influence of means to be explained later over the respective tooth of the gear wheel 80 back into the position 136'. This is repeated during the third calculating step, so that the computing device 33 by a further addition forms the partial product 356×3=1068, while the storage wheel $80_1$ is rotated from the position "9" into the position "0." Now the tooth $86_0$ has come under the scanning end 92 which in a manner to be explained later has the result that the pin carriage 19 and the switch carriage 94 are slidably shifted to a higher decimal point, which in FIG. 3 corresponds to a slidable downward movement.

The scanning end 92 of the scanning lever 88 now engages the mutilated gear wheel 86 of the storage wheel $80_2$ which on account of the action of the swingable bar 136 is not in the originally adjusted position "8," but is in the position "9." In the ten-position the multiplicand accordingly is not multiplied by 8, but by 9, because in accordance with the abbreviated method explained previously it was multiplied in the single digit position not by 7 but by 3. In the ten position a single calculating step is sufficient to bring the tooth $86_0$ of the storage wheel $80_2$ under the scanning lever end 92. This has as a result a further advance of the pin carriage 19 and of the switch carriage 94 into the hundreds digit position. The computing device 33 contains now the total of the partial products $$-10 \cdot 356 \times 1 = -3560$$
$$-1 \cdot 356 \times 3 = -1068$$
$$\overline{-4628}$$

In the hundreds digit position the scanning end 92 of the scanning lever 88 lies in the position 2+1=3 on the mutilated gear wheel 86 of the storage wheel $80_3$, namely on the tooth $86_3$ which is only one half as high as the tooth $86_0$. The shoulder 133 on the scanning lever 88 is now in the position 133a, namely in the path of the projection 132 of the swivel plate 116 and the impact end 127 rotates accordingly the storage wheel $80_3$ in counterclockwise direction a distance equal to one tooth division to its "0" position. In this manner the tooth $86_2$ comes to lie under the scanning end 92 and the swingable bar 136 is now pivoted back from the position 136' into the original position indicated in full lines. The swingable bar 136 furthermore rotates the storage wheels $80_4$ to $80_{12}$ again back a distance of one tooth, so that they return from the position "1" into the "0" position. The storage wheels $80_1$ and $80_2$ which already were brought back earlier into the "0" position, are not influenced by this backward pivotal movement of the swingable bar 136, because the pivot axis 135, on account of its coupling 138–140 with the switch carriage 94 accompanies the transverse movement of the latter and now lies no longer opposite the longitudinal bar 136, but lies opposite the narrower longitudinal bar 138 which does not engage the gear teeth 81 of the storage wheels $80_1$ and $80_2$. After two further calculating steps, which also bring the storage wheel $80_3$ back into the "0" position, the computing device 33 contains then the sum of the partial products:

$$+100 \cdot 356 \times 3 = +106800$$
$$-10 \times 356 \times 1 = -\phantom{00}3560$$
$$-1 \cdot 356 \times 3 = -\phantom{00}1068$$
$$\overline{356 \times 287 = +102172}$$

Now all storage wheels $80_1$ to $80_{12}$ are again located in the "0" position.

If instead of 287×356 the product of, for example, 247×356 is to be determined, the return pivotal movement of the swivel bar 136, which in the units digit position was moved into the position 136', takes place not only into the hundred digit position, but already into the tens digit position, because in the latter the scanning end 92 lies in the position "4+1=5" of the half-sized tooth $86_5$, and the impact end 127 accordingly causes a rotation of the storage wheel $80_2$ in counterclockwise direction. The hundreds digit storage wheel $80_3$ is shifted back with the storage wheels $80_4$ to $80_{12}$ a distance of one tooth and returns again to the original position "2," so that only two calculating steps or impact movements, respectively, are necessary in order to bring it back into its "0" position, corresponding to the calculation scheme:

$$247 \times 356 =$$
$$-1 \cdot 356 \times 3 + 10 \cdot 356 \times (4+1) + 100 \cdot 356 \times 2 = 87932$$

It is accordingly apparent that the swingable bar 136 in an extremely simple manner effects an increase of the following multiplier numbers of higher digit by "1" when in a decimal place instead of the multiplier number its complement is used for the calculation, and that as soon as in one of these following decimal digits not the complement of the multiplier number increased by "1" is used, this increase by "1" for the further decimal digits is cancelled again.

As already indicated, in multiplier devices operating according to the abbreviation method, it is necessary to connect the multiplier storage device by means of a control device with the computing device in order to bring the latter into the correct addition or subtraction position. The control device 150 described in the following with reference to FIGS. 3 and 6, which serves for this purpose, is much simpler than the earlier control devices.

The control device 150 is provided with a swivel plate 151 which is pivotable about a pin 152 fixed to the framework and has a somewhat heart-shaped aperture 153 through which passes the shaft 135 of the swingable bar 138 so that the latter engages two points 154 lying opposite one another on the edge of the aperture 153 so that the bar 138 when pivotally moved may take the swivel plate 151 along. In order to clarify the cooperation with the multiplier storage device 73 (see particularly FIG. 5), the swingable bar 136 and the frame 77, the storage wheels 80 and the rods 78 and 79 are shown in dash-dotted lines. The swivel plate 151 carries a pin 155 which may engage in the one or the other of two recesses 156a and 156b of a ratchet lever 157. The ratchet lever 157 is pivotal about the rod 78 fixed to the frame, and is under the influence of a spring 159 which attempts to rotate it in counterclockwise direction. It is apparent that when the swingable bar 138 indicated in full lines in the position "+" necessary for addition is swung into the dash-dotted line position 138', "−", necessary for subtraction, it rotates the plate 151 in counterclockwise direction so that the pin 155 leaves the recess 156a after turning aside to the right of the ratchet lever 157 and enters the recess 156b. It is now also apparent that the dropping of the swingable bar 136 into one or the other of the two positions shown (after a shifting which effects no rotation of the storage wheel 80) is effected by the recesses 156a or 156b, respectively, and the spring 159.

A rod 160 is slidably journaled on its right hand end by means of a fork 161 on the pin 152 and is pivotally attached with its left hand end at 162 to the upper end of a lever 163 indicated as "Indication lever" (plus or minus sign). The rod 160 carries a pin 164 which engages in the illustrated plus position a lower step 165 or the edge of the swivel plate 151, but upon shifting of the latter into the minus position is raised to a higher step 166, which has the effect that the indication lever 163 is rotated counterclockwise ("minus" shifting) about its axis of rotation 168 fixed to the frame. The indication lever 163 has on its lower end an inclined slot 169 in which is slidable a pin 170 which is fixed to the upper end of a rod 171 connected by a swivel-device 172 with the computing device 33.

The pin 170 has also pivoted thereto an arm 173 which is rotatable about a rod 174 fixed to the frame. It is apparent that upon the minus rotation of the indication lever 163 the pin 170 slides along the slot 169, so that the arm 173 is rotated somewhat downwardly whereby the rod 171 also is pushed downward. The rod 171 has at its lower end a fork 175 which surrounds a pin 176 which is provided on an angular deflector lever 177 which is pivotally journaled at 178 on a slide member 179. The deflector lever 177 has on one end a deflector nose 180, and on the other end an abutment member 181.

The slide member 179 is provided on its edge with two oppositely directed slots 182 and 183, by means of which it is guided on two rods 184 and 185 fixed to the frame. The slide member 179 also has an aperture 186 between its ends which is provided with a central bulge $186_0$ and two symmetrical bulges 186a and 186b. In the central position of the slide member 179, as shown, there lies in the central bulge $186_0$ a rivet 187 which is carried by a lever 188 rotatably mounted on the rod 185. The upper edge of the slide member 179 is provided with a rectangular recess 189 which forms two oppositely arranged abutment shoulders 190 and 191 for the stop member 181. The slide member 179 also has a short slot 192 below its center axis through which passes a pin 193 which by means of a diagrammatically indicated kinematic connection 194 may be reciprocated by the main shaft 59 between its position indicated in full lines and a position 193' indicated in dash-dotted lines, whereby for one complete reciprocating movement one complete revolution of the main shaft 59 is required. The kinematic connection 194 cooperates, as in the Model 162, with a switch device 195 which is able to render the connection 194 operative or inoperative. The switch device 195 is actuated by the nonadding or number key #, by the intermediary totalizing key ◊ and the final summation key *, which in the present circumstances requires no explanation.

The lever 188 is provided with a reversing finger 196 which abuts on one side the rod 36 and on the other side engages the rod 37 of the computing device 33. These rods 36 and 37 which carry the gear wheels 34 and 35, respectively, are journaled in a frame 197 which is pivotable about the rod 38 fixed to the frame.

When the control device 150 is in the illustrated plus position and the finger 193 is moved by the kinematic connection to 193', the following occurs:

The slide member 179 moves in the direction of the arrow 198 so that the pin 187 moves out of the bulge $186_0$ of the aperture 186 of the slide member 179 and by the deflector nose 180 of the deflector lever 177 is directed into the lower bulge 186a. The pin 187 is deflected downwardly and rotates the lever 188, on which it is mounted, in clockwise direction about the rod 185. The reversing finger 196 presses laterally upon the axle 36 and rotates the computing device 33 about the rod 38 until the gear wheels 34 enter into engagement with the rack bars 29.

When the control device 150 by a swinging movement of the swingable bar 138 is moved into the position 138', namely into the minus position, then the pin 155 enters into the recess 156b and the rod 171, as described, is moved downwardly by the parts 166, 164, 162, 163, 170. The fork 175 of the rod 171 rotates the deflector lever 177 in counterclockwise direction so that the deflector nose 180 comes into a position indicated by the reference character 180'. This has the result that upon movement of the slide member 179 in the direction of the arrow 198 the pin 187 enters now not the lower but the upper bulge 186b and is deflected upwardly. Therefore, the lever 188 will be rotated in the opposite direction, namely counterclockwise, and the reversing finger 196 moves now the computing device 33 into the minus direction, that is, the gear wheels 35 enter into engagement with the rack bars 29.

The stop member 181 on the deflector lever 177 prevents through cooperation with the abutment shoulders 190 and 191 of the slide member 179 that the deflecting lever 177 is moved too far in the one or in the other direction by the fork 175 or the pin 187.

As long as the multiplication operation lasts, as explained already in the foregoing, during each calculating step the computing device 33 is brought either in the plus or minus direction once into engagement with the rack bars 29, and it has now been shown in what manner the plus or minus engagement is dependent on the position of the swingable rod 138 and therewith ultimately on the position of the storage wheels 80. It is still to be shown in what manner the multiplication is accomplished by the function keys x, ◊ or *. For this purpose first a control device 210 is to be described which principally is shown in FIG. 6 and which, when it is actuated after the first factor has been entered by the keys, causes the multiplier storage device 73 to receive this factor. To this end, as explained previously, the gear teeth 81 of the storage wheels 80 must mesh with the rack bars 11, that is, that the frame 77 must undergo a slight pivotal shifting from the position shown in FIG. 6 in clockwise direction about the rod 78.

The control device 210 is provided with a swivel plate 211 which is rotatable about a fixed pin 212 and has an aperture 213 as well as a slot 214 through which latter the rod 79 of the storage wheels 80 passes. The slot 214 comprises two steps 214a and 214b, the first of which has a greater radial distance from the pin 212 than the other. Since the pin 212 is disposed beneath the slot 214, it is apparent that when the plate 211 is rotated clockwise and the rod 79 in view thereof moves from the step 214a to the step 214b, this rod 79 and accordingly the frame 77 of the multiplier storage device 73 carry out the desired slight rotative movement in clockwise direction about the rod 78.

The swivel plate 211 has pivotally attached thereto by means of a pin 215 an angle lever 216, one end of which is connected by a kinematic connection 217 with the function key "x". The other end of the angle lever 216 has a rounded recess 218 which is engaged by a pin 219 mounted on one end of a rod 220 and projecting through the aperture of the swivel plate 211. The lever 216 may also assume the dash-dotted line position indicated at 216 in which the pin 219 cannot lie in the recess 218. The position of the different parts shown in FIG. 6 corresponds, however, to the case in which the lever 216 by exerting pressure upon the key "x" has been moved from its only partially shown rest position 216' into the position shown in solid lines.

The rod 220 is guided on the one hand by the rod 78 which passes through a slot 221 in the rod, and on the other hand the rod 220 is pivoted at 222 to a lever 223 which is pivotally mounted on the rod 174 and carries a cam roller 224 which by a spring 224a attached to the lever 223 is pressed against the circumference of a cam disc 225. The cam disc 225 is fixedly mounted on the main shaft 59 and it is apparent that by a rotation of the same in counterclockwise direction from the position shown, the lever 223 is first rotated in clockwise direction, until the cam roller 224 engages the portion 225a of the cam disc having the greatest radius. During this movement the rod 220 is pushed to the right and rotates by its pin 219 and the angle lever 216, the swivel plate 211 in clockwise direction. In view thereof, as already mentioned, the rod 79 is pressed downward in the slot 214 and the multiplier storage device 73 is tilted downward, so that the storage wheels 80 by their engagement with the rack bars 11 may receive the multiplier.

Upon further rotation of the cam disc 225, the cam roller 224 moves from the portion 225 to a portion 225b having a much smaller radius, so that by the opposed rotation of the lever 223 and the swivel plate 211 the multiplier storage device 73 is rotated back into the illustrated position and the multiplication can be carried out only in the manner already described. The return rotation of the swivel plate 211 is effected by the pin 219 fixed to the rod 220. The function key "x" returns after one revolution of the main shaft 59 in the usual way to its position of rest, and also the angle lever 216 returns to its position of rest 216' in which its recess 218 is not in the path of movement of the pin 219, so that the revolutions of the main shaft 59 effecting the multiplication are without effect on the position of the multiplier storage device 73. It is further pointed out that the kinematic connection 217 on the angle lever 216 engages at a point 226, which in the effective position of this lever 216 lies in the prolongation of the ideal axis of the stationary pin 212, so that the actuation of the function key "x" in itself does not result in any rotative movement on the swivel plate 211 which is journaled on this finger 212.

FIG. 6 also indicates in what manner the computing device 33 is controlled by the minus key, namely by a kinematic connection 227 which is provided between this key "—" and the projection 228 on the arm 173. Upon depressing the key "—", the arm 173 is rotated somewhat in clockwise direction, which causes the pin 170 to move the rod 171 downward so that in the described manner the computing device 33 is brought in the minus direction into engagement with the rack bars 29.

The FIGS. 7 and 8 illustrate a further control device 240 serving for the control of the multiplier storage device 73. This control device 240 is provided with a stationary rod 241 which on its circumference has arranged a radial bar 242 (locking bar) which in the position of FIG. 7 lies over projections 243 of the scanning levers 88 mounted on the rod 87. The locking bar 242 prevents in this position (locking position) that the scanning levers follow the pull of their springs 91 and thereby come to lie with their scanning ends 92 upon the mutilated gears 86 on the storage wheels 80. A pawl 245 is pivotally attached by a pin 244 to the frame 77. This pawl under the influence of a spring is rotated counterclockwise until it abuts the rod 87. The pawl 245 has a nose 247 at its upper free end which may pass through a recess 248 in the edge of the locking bar 242 (FIG. 8). When the frame 77 in the manner described previously is rotated in clockwise direction in order to bring the storage wheels 80 into engagement with the rack bars 11, the pawl 245 comes into the position indicated in dash-dotted lines 245' and upon swinging back of the frame 77 into its rest position, the pawl 245 moves again to the right and pivotally moves in this way the bar 242 into the position 242' shown in dash-dotted lines in which it can no longer prevent the scanning levers 88 from following the pull of the springs 91. The FIGS. 3 and 4 show that the locking bar 242 in this position assures the described function of the scanning lever 88. Those scanning levers 88 whose storage wheels 80 now have a position different from "0" and whose projections 243 in view thereof are found in one or the other of the raised positions 243a or 243b indicated by two dash-dotted lines, now prevent a dropping of the locking bar 242 into its locking position, while the nose 247 on the pawl 245 has moved to the right from the recess 248.

With reference to FIGS. 9a and 9b, a drive mechanism 250 will now be described which serves for operating the swingable bar 113 shown in FIG. 5, and which in turn drives the impact member 115 which effects the rotation of the storage wheels 80 back into their "0" position.

The drive mechanism 250 comprises a drive lever 251 which is journaled between its ends on a stationary rod 252 and carries two rollers 253 and 254 which engage two cam discs 255 and 256, respectively, fixed to the main shaft 59. Each revolution of the shaft 59 causes the drive lever 251 to move once back and forth. At the upper end of the drive lever 251 is pivoted the left hand end of ad rive rod 257 which at its right hand end has an elongated slot 258 through which projects a pin 259 fixed to a stationary wall 260. Above the elongated slot 258 the drive rod 257 has in its upper edge a transverse slit 261 in which a pin 262 may enter which is arranged on a slide member 263 and is guided in a slot 264 provided in the wall 260. The slide member 263 has in its lower edge a stepped slot 265, into the narower part of which extends the swingable drive bar 113 and into whose wider part its shaft 114 projects. A connecting rod 268 is provided with two slots 269 and 270 through which extends the rod 95 fixed to the frame and another stationary rod 271.

When the connecting rod 268 is pushed downward in a manner to be explained later, it moves by a pin 266 thereon the slide member 263 downward so that its pin 262 comes into a position 262' indicated in dash-dotted lines, in which it engages the transverse slit 261 of the drive rod 257 and thereby couples the latter with the slide member 263. It is apparent that the drive lever 251 is now pivotally moved by the cam discs 255 and 256 away from the position shown in counterclockwise direction and thereby moves the rod 257 to the left, and the slide member 263 coupled with the rod rotates the swingable bar 113 into the position shown in dash-dotted lines (see also FIG. 5). As long as the connecting rod 268 is pushed downward, the swingable bar 113 at each revolution of the main shaft 59 is swung once to and once fro.

The actuation of the connecting rod 268 takes place by means of a slanting two-stepped slot 272 provided in the vicinity of its lower end. This slot 272 receives a pin 273 which is attached on a further connecting rod 274 to which is secured a spring 275 trying to move the rod 274 to the left. The rod 274 is provided at its lower end with a slot 276 through which extends a guide rod 271. The rod 274 is arranged according to FIG. 13 on the left hand side of the framework 6 and the same also holds true for the drive mechanism 250 which is not shown in this FIG. 13. The end of the connecting rod 274 located in FIG. 9b at the upper right hand portion according to FIG. 13 is pivoted to the one end of a rocker 278 which is pivotable about a pin 277 fixed to the framework; the other end of the rocker is pivoted to a lever 279 located on the right hand side of the framework 6. Also the other parts of a starting mechanism 280 described in the following with reference to FIGS. 9a and 9b are located on the right hand side of the framework 6. The starting mechanism 280 comprises a rod 281 which by means of a fork 282 at one end is slidably (FIG. 9a) journaled on the main shaft 59 and by a spring 283 is drawn to the left. The rod 281 is further supported on an axle 284 (FIG. 9b) fixed to the framework. The axle 284 passes through an elongated slot 285 on the rod 281. On the rod 281 is rotatably mounted a roller 286 (FIG. 9a) which under the influence of a spring 283 is urged against a cam disc 287 fixed on the main shaft 59, so that the rod 281 upon a revolution of the cam disc 287 is moved once to and fro. The rod 281 carries also a pin 288 (FIG. 9b) which may cooperate with a shoulder 289 on a pawl 290 which is pivoted at 291 to the lever 279 and by a kinematic connection 293 may be rotated by depressing the function keys "$\bar{\bar{x}}$" and "$\bar{\diamond}$" in counterclockwise direction. The pawl 290 has a finger 294 and is connected to a spring 295 so that as a result of the action of this spring the finger 294 is urged against the pin 288 on the rod 281. In the illustrated position of rest the finger 294 guides the pin 288 upon movement of the rod 281 to the right into a slot 296 in the pawl 290 so that the latter is not hit by the pin 288. When the pawl 290, however, by depressing one of the keys "$\bar{\diamond}$" or "$\bar{*}$" is pivoted downward, the pin 288 will engage the shoulder 289 on the pawl 290 which will then be in the position 289' so that the pawl 290 follows the movement to the right of the rod 281 and thereby rotates the lever 279 about its bearing axle 297 which is fixed to the frame, in counterclockwise direction as is indicated by an arrow.

It is apparent that this on account of the rocker 278 has as a result a movement of the connecting rod 274 toward the right (FIG. 9b) so that the connecting rod 268 is moved downward by the pin 273 and the slanting two-stepped slot 272, and accordingly, as has been shown previously, the swinghole bar 113 is set in motion. Before it is described in what manner the swingable bar 113 after completion of the multiplication is again rendered inoperative, there will be described briefly a few additional connecting elements shown in FIG. 9, which are connected by means of the lever 279 with the connecting mechanism 280.

The lever 279 is provided between its ends with a finder 298 which engages in a slot 299 in a lever 300. The lever 279 also has an aperture 301 into which projects one end of the rocker or lever 278. The lever 279 is further provided with a guide slot 303 in which engages a pin 304 mounted on one end of a lever 305. The lever 305, which is pivotally mounted between its ends on a stationary pin 306, engages with its other end 307 a recess 308 in a lever 309. The purpose of the parts 298–309 will be explained later. First there will be described with reference to FIG. 10 in what manner the drive mechanism 250 for the swingable bar 113 is disconnected after the multiplication has been completed.

The disconnect mechanism 320 shown in FIG. 10 for the swingable bar 113 is arranged, just as the drive mechanism 250, on the left hand side of the framework and comprises a pivotable slide member 321 which has at its lower end a slot 322 for mounting the member 321 on the rod 211. On the slide member 321 is mounted a pin 323 which on one hand lies in a fork 324 of a lever 325 and on the other hand in a fork 326 of a lever 327. The slide member 321 is provided also with a hook 321a which upon rotation of the slide member 321 in counterclockwise direction may engage a projection 328 of the drive rod 257 (see also FIG. 9), said projection being perpendicular to the plane of the drawing.

The lever 325 is pivotally mounted on the rod 95 and is under the influence of a spring 329 which tries to rotate the lever 325 counterclockwise. On the upper end of the lever 325 is provided an asymmetrical fork 330 which encloses the locking bar 242 which cooperates with the scanning levers 88 in the manner described with reference to FIG. 7. The lever 327 is pivotally mounted on the rod 271 and a spring 329 attempts to rotate the lever 327 counterclockwise, so that an arm 331 on this lever 327 strikes against a projection 332 of the connecting rod 274 disposed perpendicularly to the plane of the drawing (see also FIG. 9). When the connecting rod 274 is moved to the right by depressing the keys "$\bar{\diamond}$" or "$\bar{*}$" in the manner described previously, the projection 332 comes into the position 332' shown in dash-dotted lines in FIG. 10 in which it engages in back of a shoulder 333 of the lever 331, which comes into the position 333' so that the connecting rod 274 is interlocked with the lever 327.

In view of the resulting pivotal movement of the lever 327 in counterclockwise direction, the fork 326 comes into the position 326' and the pin 323 in the forks 326 and 324 moves into the position 323' so that the slide member 321 is rotated in counterclockwise direction and its hook 321a lies in the position 321a' over the projection 328.

The lever 325 is shown in that position which it assumes during the multiplication operation and in which it comes when the locking bar 242 engaging the fork 330 in the manner described previously is counterclockwise rotated by the pawl 245. The spring 329 attempts to rotate the lever 325 counterclockwise which, however, will be prevented by the locking bar 242 as long as not all the scanning levers 88 have returned by the return of all storage wheels 80 into their "0" position. After completion of the multiplication or return, respectively, of all scanning levers 88 into their "0" position, the locking bar 242 is brought by the spring 329 and by means of the lever 325 into its locking position 242" indicated in dash-dotted lines in FIG. 10, said locking position being also shown in full lines in FIG. 7. The accompanying counterclockwise rotation of the lever 325 causes the pin 323, which is in position 323', to press the slide member 321 downward, and thereby during the return of the connecting rod 257 the hooks 321a are moved into the deflection path 328. Through the impact of the deflection 328 on the front edge of the hook 321a, the lever 327 is rotated in clockwise direction and accordingly releases the interhooking of the shoulder 333 with flaps 332 of the rod 274, which now under action of the spring 275 drops back into its starting position. The pin 273 lifts the rod 268 which on its part by lifting the slide member 263 releases the coupling of the rod 114 with the connecting rod 257.

With reference to the FIGS. 11–13, there will now be explained some additional mechanisms of the multiplication device, which by means of the lever 279 (see FIG. 9) are associated with the connecting mechanism 280 and of which the parts 298 to 309 have already been mentioned in connection with the FIGS. 9a and 9b.

A substantially horizontally mounted lever 300 according to FIG. 11 is pivotable about a pin 340 fixed to the framework and has at its right hand end 341 the previously mentioned slot 299 into which the finger 298 of the lever 279 projects. Upon a rotative movement of this lever 279 in counterclockwise direction, as viewed in FIG. 9, the end 341 of the lever 300 is moved downward so that the lower longitudinal edge 342 (setting edge) of the lever 300 may engage a series of twelve pins 343. Each pin 343 forms a projection of an "0" pin 18 of the pin carriage 19 (see also FIGS. 2 and 13) and projects perpendicularly to the direction of movement of the pin 18. The pin carriage 19 is under the influence of a horizontally disposed spring 344 which attempts to draw the pin carriage to the left along its guide rods 24 and 25 (see FIG. 2). The pin carriage 19 follows in a manner to be described in more detail later this action of the spring 344. Upon a downward pivotal movement of the lever 300, all "0" pins 18, which at the particular position of the pin carriage 19 are positioned below the setting edge 342, namely to the right of a shoulder 345 of the lever 300, are pressed downward into the position indicated in dash and dotted lines for one of these pins at 18'. In this position the pin 18 prevents as shown in FIG. 2, by means of the projection 16 of the lever arm 13 a forward movement of the respective rack bar 11.

The ends of two locking pawls are designated with 346 and 347 and belong to a locking mechanism of conventional type which upon the entering of a factor into the pin carriage 19 causes the pin carriage to move to the left a step, following the tension of the spring 344, which upon entering each number corresponds to one decimal point. This locking mechanism cooperates with the zero pins and becomes ineffective upon a downward pivotal movement of the lever 300 so that the pin carriage 19 coupled with the carriage 94, upon multiplication and formation of a partial product, or after the return of the respective storage wheel 80, may move farther one step or several steps in case the following storage wheel 80 stands at "0".

The lever 309 according to FIG. 11 is pivotally mounted about an axle 348 fixed to the frameweork and has at its right hand end a rectangular recess 308 in which the end 307 of the lever 305 found to the left in FIG. 9b engages. The left hand end of the lever 309, indicated with the reference character 349, engages a slot 350 of the coupling carriage 97 (see FIG. 4). When the lever 279 is rotated counterclockwise (FIG. 9) and by means of its slot 303 and the pin 304 rotates the lever 305 clockwise, the end 307 of this lever 305 is moved upward, which according to FIG. 11 has as result a rotating of the lever 309 in counterclockwise direction. The left hand end 349, therefore, moves the coupling carriage 97 downward so that its coupling nose 98 (see FIG. 4) engages in the respective notch 100 in the edge of the pin carriage.

In FIG. 13, the coupling carriage 97 is shown in the starting position of the switch carriage 94 in which it is located on a shoulder 351 provided on the rear upper edge 352 of the keyboard. The projecting part of the keyboard edge 352 disposed to the left of the shoulder 351 is indicated with the reference numeral 352a. When the coupling carriage 97 is moved downward in the described manner and the switch carriage 94 is coupled with the pin carriage 19, there takes place at the same time a downward pivotal movement of the "0" pin setting lever 300 and the locking mechanism 346, 347 is made ineffective, so that the pin carriage 19 may follow the pull of the spring 344, whereby the upper edge of the coupling carriage 97 comes to lie below the projecting part 352a of the keyboard edge 352, which holds it tight in its coupling position shown in FIG. 4. The pin carriage 19 follows the pull of the spring 344 so far until the projection 93 (see FIG. 5) of the connecting carriage 94 engages the lug 89 of the first scanning lever, said lug being in the position 89' or 89", the scanning end of the lever resting on a storage wheel 80 disposed not in the "0" position. When the storage wheel 80 by the impact member 115 is rotated back to the "0" position and so forms the respective partial product, or is received in the computing device 33, the lug 89 of the respective scanning lever 88 permits the switch carriage-pin carriage assembly to follow again the pull of the spring 344 up to the next scanning lever 88 which is not in the "0" position, etc.

FIG. 11 also shows an erasure device 360 for the pin carriage 19 with which all pins are slidably pushed back again into their starting position, that is, into their upper ineffective position, when the pin carriage 19 at the end of an operation in the usual manner is moved back against the tension of the spring 344 into its position shown in FIG. 11.

The erasure or cancellation device 360 is provided with an erasure plate 361, whose left hand margin 362 is downwardly inclined. In the Model 162 this erasure plate 361 is in the vertical direction for the movement of the pin carriage 19 so wide that with the erasure movement of the pin carriage 19 taken place in direction of the arrow 363 of FIG. 11 all downwardly adjusted pins 18 will engage the downwardly inclined left hand margin 362 of the erasure plate 361 and then are pushed upwardly. In the present calculating machine, the erasure plate 361 is somewhat narrower so that only the pins corresponding to the numbers "1" to "8," of which in FIG. 13 the pins corresponding to the numbers "1" and "2" are designated by the reference characters $18_1$ and $18_2$, will be engaged by the margin 362 of the erasure plate 361, but not the pins 18 which correspond to the number "0." If also the pins 18 corresponding to the number "0" were arranged over the erasure plate 361, it would not be possible to shift them downward by means of the "0" pin adjusting lever 300; these are pins 18 which after entering the second factor (multiplicand) into the machine by means of the keys are located to the right of the unit digit position (or to the right of the shoulder 345).

In order to bring also the "0" pin 18 into the starting position, the erasure device 360 is provided with an erasure carriage 364 which has two spaced inclined slots 365, by means of which it is supported on two spaced parallel axles 366 fixed to the framework. A spring 367 attached to the erasure carriage 364 attempts to draw the erasure carriage 364 to the left so that the right hand upper and edges of the inclined slots 365 engage the axles 366. The erasure carriage 364 has at its hight hand end an upwardly extending projection 368 which extends into the path of movement of the pin carriage 19.

The pin carriage 19 is moved during its erasure movement in the direction of the arrow 363 in the usual manner and moves beyond its starting position shown in FIG. 11 a distance of one step toward the right, and thereafter returns under the action of the spring 344 a distance equal to this step to the left, and hereby the locking device 346, 347 holds on to the first pin 18. This excess movement to the right has the result that firstly also the series of pins $18_1$ to $18_8$ corresponding to FIGS. 11 and 13 and located farthest to the left are engaged by the erasure plate 361 and thereby brought into the starting position, and secondly, the excess movement has the result that the right hand lower end of the pin carriage 19 is moved by the projection 368 and the erasure carriage 364 to the right, which in view of the inclination of the slots 365 results in a raising of this erasure carriage so that its upper edge 369 engages the lower ends of the "0" pin 18 and moves the latter likewise into its starting position. It is further pointed out that in the pin carriage 19 in the usual way no pins are provided wich correspond to the number "9," because the farthest shifting position which the rack bars 11 (see FIG. 2) may assume upon their forward movement, corresponds to the number "9." This position is determined when the right hand edges of the longitudinal slots 9 and 10 provided in the rack bars 11 engage the guide rods 7 and 8.

What is claimed is:

1. A multiplication device for a three species calculating machine provided with a pin carriage, the combination comprising:
    (a) a multiplication key for entering into said pin carriage one after the other two factors to be multiplied,
    (b) rack bars which are reciprocated in response to said factors which are entered into said pin carriage,
    (c) a multiplier storage operatively connectable with said rack bars,
    (d) a computer controlled by said multiplier storage for forming therein successively according to the increased decimal points the partial products of the numbers stored in said multiplier storage with the multiplicand and adding the same,
    (e) said multiplier storage (73) including a single row of storage wheels (80) loosely rotatable on a common axle (79), each of said storage wheels being provided with uniformly spaced ten teeth covering its entire perimeter, each of said wheels having connected axially adjacent thereto a mutilated gear wheel (86), and a longitudinally slidable and transversely swingable bar (136), said bar when engaging the teeth on said storage wheels upon return of the first storage wheel (80) into its zero position from any one of its storage positions "6 to 9" advances all storage wheels of higher decimal point a distance of one tooth in positive direction, said swingable bar later making the advance so effected retrogressive again for all those storage wheels whose decimal point is higher than those of the next storage wheel which is returned to its zero position from any one of the positions "1 to 5" assumed by it,
    (f) scanning levers (88) associated with said storage wheels (80) for controlling the return of the latter, said scanning levers engaging said mutilated gear (86) said mutilated gear having one tooth ($86_0$) corresponding to the position "0" which is of the same height as the teeth (81) on the storage wheels (80), and five teeth ($86_1$ to $86_5$) in the positions "1 to 5" of approximately half that height, and a toothless portion (134) corresponding to one of the positions "6 to 9," a swivel plate (116) supported in said machine, said scanning lever (88) being provided with a first shoulder (133) arranged in the path of movement of a projection (132) on said swivel plate (116) when a scanning end (92) of said scanning lever (88) engages a tooth ($86_1$ to $86_5$) of half height, and outside this path of movement when said scanning end engages the toothless portion (134), and an impact member (115) actuated by said swivel plate, a spring for urging said swivel plate ((116) into either the one or the other direction of rotation for controlling the direction of movement of said impact member (115) which rotates the storage wheel (80) either in the one or in the other direction a distance of one tooth toward the zero position.

2. A multiplication device according to claim 1, and including a pivotal drive bar (113) for operating said impact member (115), a pin (124) on said impact member, said pin passing through an aperture (125) having two arms in a stationary wall (111) and extending into a recess (123) of said swivel plate (116) so that the latter upon its rotative movement in the one or in the other direction directs said pin (124) to the one or the other arm of said aperture (125) into which said pin is moved by the action of said impact member caused by said drive bar (113) so that the storage wheel is rotated in the respective direction.

3. A multiplication device according to claim 1, and including a second shoulder (89) on said scanning lever (88) which in the position "1 to 9" of said storage wheel (80) extends into the path of movement of a projection (93) of a switch carriage (94) movable transversely to said rack bars (11), except in the position "0" of said storage wheel; said switch carriage (94) being connectable by a clutch carriage (97) with said pin carriage (19), said pin carriage by the action of a spring (344) being adapted to be moved transversely when said second projection (89) of said scanning lever (88) in front of said projection (93) is positioned outside its path of movement, whereby the respective storage wheel (80) is arranged in its "0" position.

4. A multiplication device according to claim 3, including an arm (140) on said switch carriage (94), said arm extending through a transverse slot (139) in a narrow portion (138) of a swingable bar (136) forming an extension of said swingable bar so that said swingable bar (136, 138) takes part in the transverse movement of the switch carriage (94).

5. A multiplication device according to claim 3, including an arm (140) on said switch carriage (94), said arm extending through a transverse slot (139) in a narrow portion (138) of a swingable bar (136) forming an extension of said swingable bar so that said swingable bar (136, 138) takes part in the transverse movement of said switch carriage (94), said narrower portion of said swingable bar serving for pivoting a swivel plate (151) forming a part of a control device (150) for controlling the computing device (33) from the multiplier storage (73), and swivel plate (151) cooperating with a ratchet device (155, 157, 159) having two ratchet positions (156a, 156b) adapted to hold the transversely swingable bar (136, 138) in the one or the other of two positions in which the wider portion of said swingable bar is located on the one or the other side each of a tooth of a toothed rim (81) arranged adjacent thereto.

6. A multiplication device according to claim 5, in which said swivel plate (151) is provided on its edge with two recesses (165, 166) which cooperates with a stop member (164) by means of a linkage (160, 163, 171), and including a pivoted device (172) for determining whether the computing device (33) during a part of the duration of a multiplication operation is coupled in adding or in subtracting position with the respective rack bars (29).

7. A multiplication device according to claim 1, including a control device which, when actuated after having entered the first factor by means of the multiplication key, causes the reception of this factor into the multiplier storage, said control device (210) comprises a pivot plate (211) provided with a two-stepped slot (214) through which passes the axis (79) of said storage wheels (80), an angular lever (216) on said plate (211), said angular lever being connected by a kinematic connection (217) with the multiplication key and by its actuation causes a part (218) of said angular lever to be moved in the range of movement of a pin (219) extending through an aperture (213) of said pivot plate (211), means for imparting to said pin a reciprocating movement upon each revolution of the main drive shaft (59) of said calculating machine, whereby during said reciprocating movement by means of said slot (214) and said storage wheel axis (79) the gear wheels (80, 81) are moved into engagement with said rack bars (11), said gear wheels being disengaged from said rack bars after the multiplier has been entered into said storage wheels.

8. A multiplication device according to claim 7, including a swingable locking bar (242) common to all of said scanning levers, said locking bar preventing in its locking position a scanning of said mutilated gear wheels by said scanning levers, and upon swinging in and out of engagement with said gear wheels being moved by means of a pawl (245) into its released position (242').

9. Multiplication device according to claim 2, including a main drive shaft (59) of a drive mechanism (250) for operating said drive bar (113) for said impact member, said drive mechanism including a carriage (263) slidably disposed on said drive bar and having a pin (262) attached thereto which is mounted in a transverse slot (261) of a drive rod (257) moved to and fro by said main shaft (59) when said carriage (263) by means of a connecting rod (268) is pushed into the connecting direction, so that said drive rod (257) by means of said carriage (263) swings said drive bar (113) to and fro.

10. A multiplication device according to claim 2, including a main drive shaft (59) of a drive mechanism (250) for operating said drive bar (113) for said impact member, said drive mechanism including a carriage (263) slidably disposed on said drive bar and having a pin (262) attached thereto which is mounted in a transverse slot (261) of a drive rod (257) moved to and fro by said main shaft (59) when said carriage (263) by means of a connecting rod (268) is pushed into the connecting direction, so that said drive rod (257) by means of said carriage (263) swings said drive bar (113) to and fro, a printing mechanism and means causing said connecting rod (268) upon actuation of a first function key ($\overset{=}{\diamond}$ intermediary summation product key) to effect a printing of the product as intermediary sum, and upon actuation of a second function key ($\overset{=}{*}$ final summation product key) to effect the printing of the product as final sum, said printing being effected by a connecting mechanism (280) which is moved into operative position by said main shaft.

11. A multiplication device according to claim 10, in which said connecting rod (268) remains operatively connected as long as a spring influenced element (274) of said connecting mechanism (280) is interlocked with an element (327) of a disconnect mechanism (320), said disconnect mechanism including a lever (325) controlled by a locking bar (242), said lever under the influence of a spring (329) releasing the interlocking of said elements (274, 327) when said locking bar (242) upon the return of all scanning levers (88) into positions which correspond to the "0" position of said storage wheels (80) permits said lever (325) to be actuated under the action of said spring (329).

12. A multiplication device according to claim 10, in which said connecting mechanism (280) has a member (279) which is connected by a linkage (304, 305, 309) with a coupling carriage (97), the latter by said linkage being moved into the coupling position when said connecting mechanism (280) is actuated.

13. A multiplication device according to claim 10, in which said connecting mechanism (280) has a member (279) which is connected with a lever (300) positioned over the path of movement of a series of stop members (343) which are provided on the pins (18) of the pin carriage (19) corresponding to the number "0," said pins being arranged in such a manner that upon actuation of the connecting mechanism (280) an adjusting edge (342) of said lever (300) moves said "0" pins (18) into their operative position, whereby said stop members (343) are located after the entering of the multiplier into said pin carriage (19) below said adjusting edge (342).

14. A multiplication device according to claim 10, in which said connecting mechanism (280) has a member (279) which is connected with a lever (300) positioned over the path of movement of a series of stop members (343) which are provided on the pins (18) of the pin carriage (19) corresponding to the number "0," said pins being arranged in such a manner that upon actuation of the connecting mechanism (280) an adjusting edge (342) of said lever (300) moves said "0" pins (18) into their operative position, whereby said stop members (343) are located after the entering of the multiplier into said pin carriage (19) below said adjusting edge (342), and including a cancellation plate (361) provided with a lifting margin (362) which is only so wide that upon return movement of said pin carriage (19) it moves all of the pins, except the "0" pins, into their inoperative starting position, and a cancellation carriage (364) solely for said "0" pins (18), said cancellation carriage towards the end of the return movement of the pin carriage (19) being taken along by the latter and by means of inclined guide members (365) is pushed upward, so that it engages the "0" pins located in operative position and returns the same to their starting positions.

References Cited by the Examiner
UNITED STATES PATENTS

| | | | |
|---|---|---|---|
| 2,886,238 | 5/1959 | Plunkett | 235—63 |
| 3,005,585 | 10/1961 | Capellaro et al. | 235—63 |
| 3,037,691 | 6/1962 | Kuhn | 235—60 |
| 3,090,554 | 5/1963 | Malavazos | 235—63 |
| 3,145,923 | 8/1964 | Chall | 235—60 |
| 3,181,786 | 5/1965 | Canevari | 235—60.15 |

RICHARD B. WILKINSON, *Primary Examiner.*

STEPHEN J. TOMSKY, *Examiner.*